United States Patent Office 3,636,207
Patented Jan. 18, 1972

3,636,207
CASTOR OIL STABILIZED DIMETHYL DICHLOROVINYL PHOSPHATE INSECTICIDAL VAPOR-EMITTING SOLUTIONS
René J. Bouvet, Boulogne, and Jean Georges Daeninckx, Saint-Denis, France, assignors to Societe Anonyme Dite: L'Oreal
No Drawing. Filed Dec. 16, 1969, Ser. No. 885,638
Claims priority, application France, Dec. 20, 1968, 179,697
Int. Cl. A61k 27/12
U.S. Cl. 424—219                                    2 Claims

ABSTRACT OF THE DISCLOSURE

A stable and long lasting active insecticidal vapor emitting liquid solution product, which retains insecticidal power for at least three months, is a miscible mixture of dimethyl dichlorovinyl phosphate and 1–99 weight percent castor oil based on the weight of the mixture.

---

The present invention relates to a novel insecticidal product which is characterized by its stability and prolonged activity.

The insecticidal properties of compounds such as vinyl dialkyl phosphates, their halogen addition products and vinyl dialkyl phosphorothioates, are well-known. Of these compounds, the one most widely used is dimethyl dichlorovinyl phosphate, which is often designated by the abbreviation "DDVP." This material has the property of evaporating so as to emit in its vicinity toxic vapors that kill insects. The size of the resulting toxic zone depends mainly on the amount of vapors emitted and consequently on the surface by which the DDVP is placed in contact with the atmosphere.

While DDVP has certain advantages as indicated, it also suffers from the disadvantage of being relatively unstable. Thus, for example, in the presence of water, water vapor or traces of heavy metals, the compound has a tendency to partially decompose into chlorine products which have a rather strong odor. As a result, the DDVP rapidly loses its effectiveness against insects when it is subjected to the action of materials of the type indicated which tend to cause its decomposition. This is particularly true when the DDVP is put in contact with water vapor which is always present in the atmosphere. Consequently, the effectiveness of DDVP as an insecticide is directly related to the conditions under which the compound evaporates in the atmosphere.

To obtain a greater evaporation surface, it has previously been proposed to impregnate absorbent materials such as powders or fabrics with DDVP in liquid form. However, it has not always been possible to obtain satisfactory results in this way due to the fact that the insecticidal action rapidly ceases because of the rapid evaporation of the DDVP. Too rapid evaporation of the DDVP presents the further drawback of creating a zone in the vicinity of the evaporation surfaces which has too high a DDVP content and is, therefore, bothersome or dangerous.

In order to obviate the above disadvantages, it has been proposed to introduce DDVP as a plasticizer in a small polyvinyl chloride slab prepared under special conditions. In this way, the DDVP progressively migrates to the surface of the small slab from which it gradually evaporates to give an insecticidal action that is prolonged for three or four months. However, this type of product has the drawback that at the end of use there is always a considerably amount of DDVP in the slab with the result that when the slab is discarded, it still emits toxic fumes. A further disadvantage is that the introduction of DDVP in vinyl chloride polymer requires a relatively complex and costly process.

The principal object of the present invention is to provide an insecticidal product which is free from the above difficulties. Another object is the provision of an active compound such as DDVP which is convenient to use while at the same time offering effective and lasting protection against insects.

Broadly stated, the above objects are realized by the provision of an insecticidal article or slab comprising an absorbent support impregnated with a mixture of an insecticidally active compound such as dimethyl dichlorovinyl phosphate, and castor oil. As is known, castor oil is a product obtained from the castor bean and is designated chemically as the triglyceride of ricinoleic acid.

Any available absorbent support may be used for present purposes. As examples there may be mentioned felts, fritted plastic materials or products made up of cotton and asbestos. These various supports may be made into whatever geometric shape it is desired to give the insecticidal slab. Generally, this shape is that of a slab having a thickness of several millimeters and length which is relatively large in relation to its width. However, the shape and size of the insecticidal slabs may be widely varied and do not constitute an essential characteristic of the present invention.

The support used according to the invention is intended principally to maintain, by absorption and possibly adsorption, the mixture of DDVP and castor oil.

The DDVP and castor oil are miscible in any proportions and, according to the invention, it is advantageous to make the mixture with a castor oil content of about 1 to 99% and preferably between 40 and 60%, on a weight basis, balance DDVP or other insecticidal compound of similar characteristics.

The success of the invention is based, at least in part, on the surprising finding that castor oil is an excellent stabilizer for DDVP which prevents the degradation of this insecticide or the like and therefore considerably lengthens the period of effectiveness for the insecticide. Thus, for example, slabs impregnated with a mixture according to the invention can be kept for several months in an oven at 40° C., without the formation of the odors of the chlorine product which are characteristic of the decomposition of DDVP. It has also been noted that slabs impregnated according to the invention with DDVP/castor oil retain their insecticidal power for at least 3 to 4 months, and practically, until all the DDVP contained in the slab has evaporated.

It thus appears that the castor oil, which is added to the DDVP or like insecticide according to the invention, acts both as a retarder of the evaporation of the DDVP, thus lengthening the period of effectiveness thereof and also as a stabilizer for the DDVP, or at least the castor oil neutralizes the effect of the products which result from the spontaneous degradation of the DDVP when this insecticide is placed in an environment containing moisture.

As will be appreciated, the present invention contemplates the use of any insecticide similar to DDVP, which is stabilized and has its period of activity lengthened by the addition of castor oil.

According to a further embodiment of the invention, it is also possible to stabilize and increase the period of the effectiveness of insecticides comprising a mixture of substances similar to DDVP and other insecticides such as, for example, chlorinated terpenes, the latter being used to increase the viscosity of the DDVP.

Chlorinated terpenes, which are known contact insecticides, are available commercially from Goodrich Chemical Co., under the name "Strobane."

According to the invention, the absorbent material support should be impregnated with 1 to 5 times, and preferably 2 to 4 times, its own weight with a mixture of DDVP or its equivalent and castor oil.

For a better understanding of the invention, there are now described, without intending to be limited thereto, several illustrative examples of the invention:

EXAMPLE 1

A slab comprising a base of asbestos and unoriented cotton, in the shape of a parallelepiped, presenting a surface of 150 cm.$^2$ and having a weight of 10 g., is impregnated with 30 g. of the following mixture:

|  | G. |
|---|---|
| DDVP | 25 |
| Castor oil | 75 |

The slab thus obtained, placed in a room of about 30 m.$^3$, presents an insecticide power for a period generally of more than 3 months.

EXAMPLE 2

This example illustrates the use of a felt, whose constituents are slightly bound together with a thermosetting resin, as the absorbent support.

A slab of this felt, weighing 12 g. and having a surface of 200 cm.$^2$, is impregnated with 60 g. of the following mixture:

|  | G. |
|---|---|
| DDVP | 40 |
| Castor oil | 40 |
| "Strobane" | 20 |

This slab constitutes an excellent environment and contact for insecticides for a period of the order of 3 to 4 months.

EXAMPLE 3

A slab is made of fritted plastic having a porosity of about 60% and which is 1 cm. thick, 5 cm. wide and 18 cm. long.

This slab is impregnated with an insecticide solution by immersion for several hours in a mixture made up of:

|  | G. |
|---|---|
| DDVP | 50 |
| Castor oil | 50 |

An effective insecticidal slab having a prolonged action is obtained.

It is understood that the embodiments which have been described above are not intended to be limiting and various modifications may be made therein without departing from the scope of the invention. In particular, it will be appreciated that the invention, although it has been described with particular reference to the use of DDVP, can also be practiced with other insecticidal compounds which have chemical structures generally similar to those of DDVP. Additionally, it is evident that it is within the scope of the invention to replace the castor oil, which is a natural product, with some of its essential components, or even other chemical compounds which have the same or approximately the same composition.

The scope of the invention is defined in the following claims wherein what is claimed as new is:

1. A stable and long lasting active insecticidal vapor-emitting liquid solution product retaining insecticidal power in liquid form for at least three months consisting essentially of a miscible mixture of dimethyl dichlorovinyl phosphate and 1–99 weight percent castor oil based on the weight of said mixture.

2. The product of claim 1 wherein said castor oil is present in amounts of 40–60 weight percent based on the weight of said mixture.

References Cited

FOREIGN PATENTS 903,159   8/1962   Great Britain.

OTHER REFERENCES

Miles et al.: J. Agr. Food Chem. 10: 240–244 May–June 1962, "Stable Formulations for Sustained Release of DDVP."

SHEP K. ROSE, Primary Examiner

U.S. Cl. X.R.

43—131; 239—6, 34, 60; 424—19